T. E. CRECELIUS.
ASSEMBLING TABLE.
APPLICATION FILED APR. 24, 1912.
1,060,430.
Patented Apr. 29, 1913.
2 SHEETS—SHEET 1.
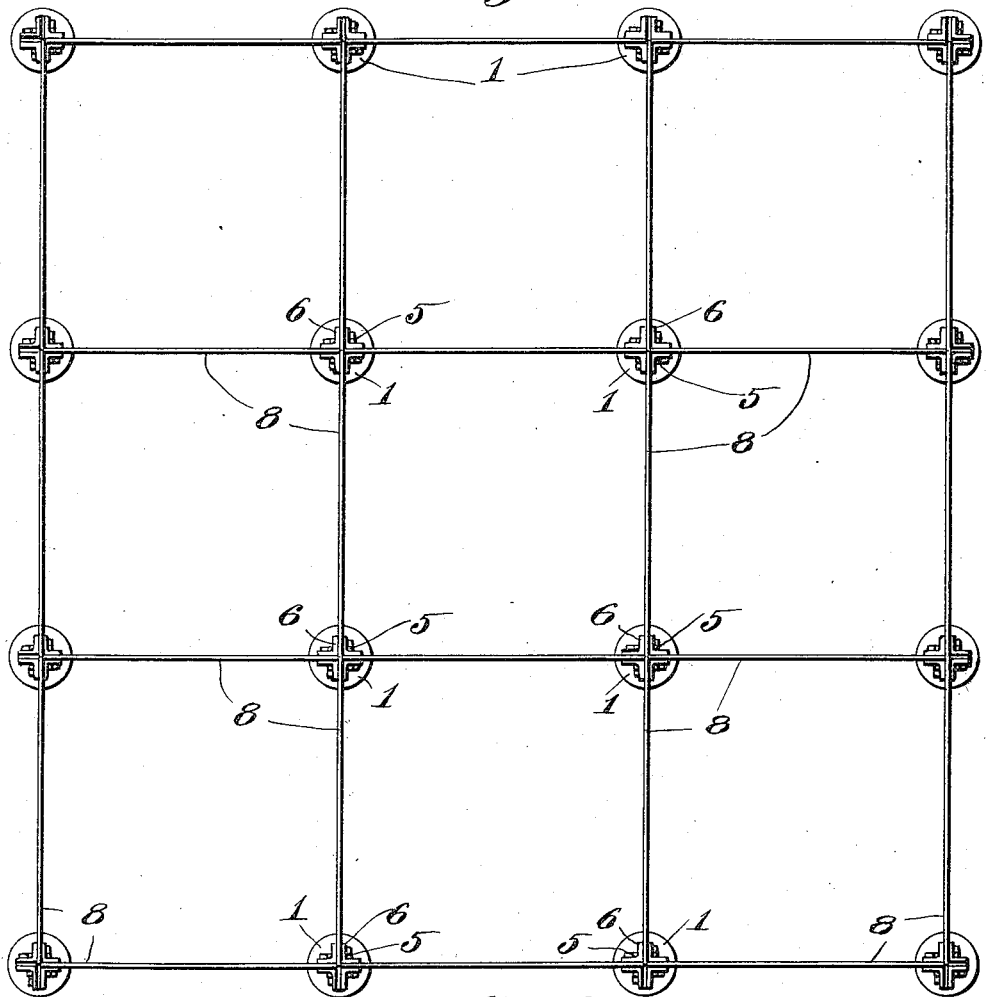
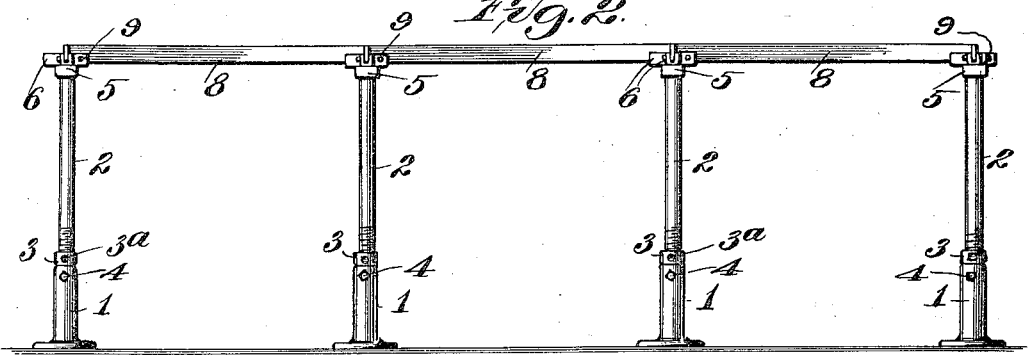

T. E. CRECELIUS.
ASSEMBLING TABLE.
APPLICATION FILED APR. 24, 1912.
1,060,430.
Patented Apr. 29, 1913.
2 SHEETS—SHEET 2.
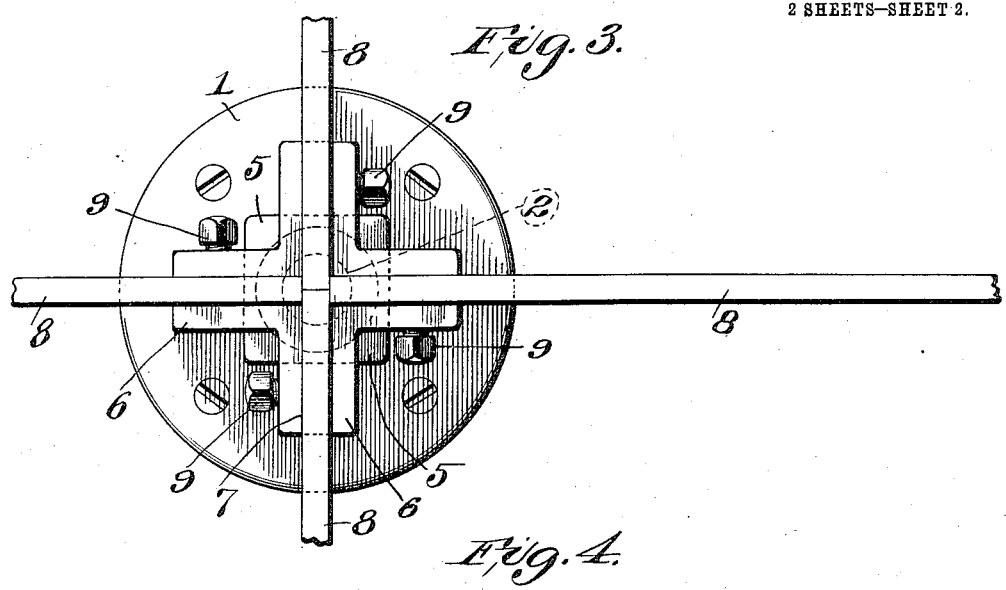
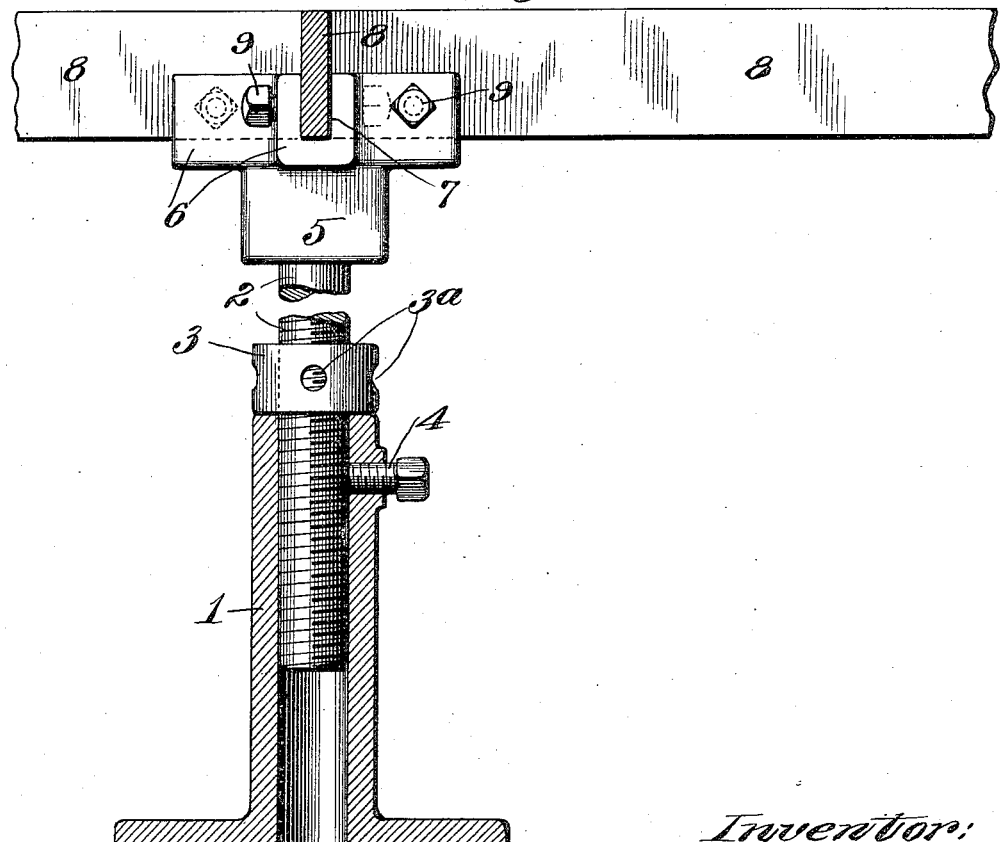

UNITED STATES PATENT OFFICE.

THEODORE E. CRECELIUS, OF ST. LOUIS, MISSOURI, ASSIGNOR TO MULTIPLEX DISPLAY FIXTURE COMPANY, OF ST. LOUIS, MISSOURI, A CORPORATION OF MISSOURI.

ASSEMBLING-TABLE.

1,060,430. Specification of Letters Patent. Patented Apr. 29, 1913.

Application filed April 24, 1912. Serial No. 692,946.

*To all whom it may concern:*

Be it known that I, THEODORE E. CRECELIUS, a citizen of the United States, residing at the city of St. Louis, State of Missouri, have invented certain new and useful Improvements in Assembling-Tables, of which the following is a specification, reference being had to the accompanying drawings, forming a part hereof.

This invention relates to certain new and useful improvements in assembling-tables, and more particularly to a new and useful table or frame-work especially adapted and designed for use in connection with the manufacture of frames made up of or comprising sections of metallic tubing or piping.

My new table is now used by me in the manufacture or production of welded or unitary metallic wing-frames for display-racks, such as shown and described in application of Louis Feldmann, Jr., and myself for Letters Patent for wings or leaves for display-racks, filed April 6, 1912, and serially numbered 689,026, and is shown and will be particularly described herein in that connection; but it is to be understood that my new table may be equally well and advantageously employed for many other purposes and in connection with the manufacture or production of articles or devices of varying kind.

In certain forms of display-racks now in use, rectangular frames made up of metallic tubing are utilized or employed in or as the swingable leaves or wings for supporting the articles of merchandise to be displayed. In the present production of such frames and as in said application fully described, the several tubular sections are first cut to proper relative lengths depending upon the size of the finished wing required and are then welded to each other to form the finished wing. The welding or uniting of the several tubular sections of the frame is preferably accomplished or performed by a suitable machine, and it is necessary that during such welding operation the said several tubular sections be properly assembled and supported.

It is, therefore, the purpose and principal object of my present invention to provide a substantially skeleton table or supporting frame-work which can be advantageously employed for properly supporting and assembling the several sections of the frame during the welding operation.

Further objects of my invention are to provide a table in sections in order that it may readily be enlarged or diminished in size corresponding to or suitable for the class of work being done; to provide independently adjustable legs or standards for the table in order that the several tubular sections of the frame depending upon the size or diameter thereof may be properly supported relatively to the welding and clamping mechanism; and to provide a simple, comparatively inexpensive, strong, and durable structure of the kind stated that will amply fulfil all the requirements of not only the particular class of work for which it is especially designed and intended, as stated, but for other classes of work as well.

To the above purposes and objects, my invention resides broadly in certain novel features of construction, arrangement, and combination of parts, all as will hereinafter be described and afterward pointed out in the claims.

In the accompanying drawings, Figure 1 is a top plan view of my new table; Fig. 2 is an elevational view of my new table; Fig. 3 is an enlarged plan view of a portion of the table; Fig. 4 is a vertical section through one of the legs of the uprights of my new table.

As shown particularly in Fig. 1, my new table comprises a number of series of tubular base members or posts 1 arranged preferably in straight rows at regular distances apart and the posts of each series being likewise preferably at equal or regular distances apart. Posts 1 are suitably fixedly secured to the floor or other supporting surface, and the series thereof may cover or extend over as large an area as desired. In the table shown in Fig. 1, there are four series of posts 1 with four of said posts to a series; but it will be readily seen that additional series may be provided, if desired or required, and the area of the table correspondingly increased or enlarged. Each of said tubular members or posts 1 is adapted to receive the lower end of a vertically-disposed rod 2, the lower end of which is threaded to receive a suitable supporting and adjusting nut 3. This nut 3 is adapted to rest on the top of post 1, as shown particularly in Fig. 9, and serves as a means for adjusting rod 2 vertically relatively to its base member or post 1. A set-screw 4 seated preferably in the upper portion of post 1 is adapted to engage with and releasably lock said rod 2 in adjusted position to its base member 1. As nut 3 is preferably round, it is, as shown particularly in Fig. 9, provided in its periphery with a plurality of recesses 3ª for the purpose of receiving the jaws of any suitable adjusting tool, as will be understood.

Formed on or suitably fixed or secured to the upper end of each rod is a member or block 5, and integral with or suitably secured to said block 5 is a substantially cross-shaped member or head 6 transversely provided on its upper face with right-angularly intersecting or crossing grooves 7 having their channels preferably horizontally disposed as shown particularly in Fig. 7. These grooves 7 are adapted to receive and form seats for the ends of horizontally-disposed or cross-members 8, in the form preferably of flat metal bars or rails, these rails or bars 8, when properly positioned and supported on said grooved heads 6, being adapted to form a skeleton supporting frame-work for the work that is to be assembled and welded or otherwise suitably secured together. As shown particularly in Fig. 8, these rails 8 are preferably of such width relatively to the depth of said grooves 7 that their upper edges occupy a plane somewhat above the plane of the top or upper surface of said heads 6; and, as shown particularly in Fig. 7, each head 6 is preferably adapted to receive and provide a seat for the meeting ends of four cross-rails 8, and screw-seated in each head 6 is a plurality of set-screws 9, one for the end of each rail 8 resting in and supported by the head, for the purpose of engaging with and removably locking the ends of said rails thereon.

By the construction described, a comparatively simple and inexpensive table is provided, and one which may be easily built up and put together. The cross rails 8 are independently removable, and it will be seen that, depending upon the size or class of work to be done, the outer rails 8 may be easily removed, so as to permit the operator or user to easily reach and manipulate work only on the inner rails.

My new table when set up for use appears as shown in Figs. 1 and 2. The rods 2 are adjusted vertically by the proper manipulation of the nuts 3, and after the upper ends of said rods have been brought to the desired height, the ends of said rails 8 are seated in said heads 6 and locked thereto by means of said set-screws 9.

The supporting frame-work of the table can be adjusted to different heights as desired by proper manipulation of the nuts 3, and any part or all of the frame-work made up of the rails 8 and the rods 2 can be easily and quickly taken apart by loosening set-screws 4 and 9 and detaching the rails 8 from heads 6 and removing the rods 2 from tubular standards 1. An assembling table of my improved construction is comparatively simple and inexpensive, can be easily and quickly arranged, adjusted, or taken apart, and is especially advantageous when used in connection with welding machines and in the manufacture or production of welded metallic frames.

It will be readily understood that minor changes in the size, form, construction, arrangement, and combination of the various parts of my new table can be made and substituted for those herein shown and described without departing from the nature and principle of my invention.

Having thus described my invention, what I claim and desire to secure by Letters Patent is:

1. In a skeleton table of the class described, the combination with spaced-apart series of fixed uprights, the uprights of each series being also spaced apart one from the other, of heads on the upper ends of said uprights, and series of horizontally-disposed rails for connecting said uprights, said heads receiving and seating the ends of said rails; substantially as described.

2. A skeleton table of the class described comprising series of fixed uprights arranged at regular distances apart and the uprights of each series being likewise arranged at equal distances apart, heads on the upper ends of said uprights, series of horizontally-disposed cross-rails connecting the uprights of different series and having their ends removably resting upon the heads thereof, and series of horizontally-disposed rails connecting the uprights of the same series and having their ends removably resting upon the heads thereof; substantially as described.

3. A skeleton table of the class described comprising series of uprights arranged at regular distances apart and the uprights of each series being likewise arranged at equal distances apart, series of horizontally-disposed cross-rails connecting, and removably resting upon the upper ends of, the uprights of different series, and series of horizontally-disposed rails connecting, and removably resting upon the upper ends of, the uprights of the same series, the upper end of each of said uprights being adapted to support the ends of four of said cross-rails; substantially as described.

4. A skeleton table of the class described comprising series of fixed uprights, heads transversely grooved on their upper face on the upper ends of said uprights, and cross-rails having their ends removably seated in said grooved heads; substantially as described.

5. In a skeleton table of the class described, the combination with a plurality of spaced-apart fixed uprights, of heads on the upper ends of said uprights, said heads being grooved on their upper face, cross-rails for connecting said uprights, the grooves of said heads being adapted to removably receive and seat the ends of said rails, and means on said heads for engaging said rails at their ends to releasably lock the same to said heads; substantially as described.

6. A skeleton table of the class described comprising series of uprights, grooved heads on the upper ends of said uprights, cross-rails having their ends removably seated in said grooved heads, each of said heads being adapted to accommodate the meeting ends of four of said rails, and means on each of said heads adapted to independently lock the ends of said rails thereto; substantially as described.

7. In a skeleton table of the class described, the combination with a plurality of spaced-apart vertically adjustable uprights having their bases fixed in position, of series of horizontally-disposed rails for connecting said uprights, the upper ends of said uprights receiving and seating the ends of said rails; substantially as described.

8. In a skeleton table of the class described, the combination with a plurality of spaced-apart independently vertically adjustable uprights having their bases fixed in position, of series of horizontally-disposed rails for connecting said uprights, the upper ends of said uprights removably receiving and seating the ends of said rails; substantially as described.

9. In a skeleton table of the class described, the combination with a plurality of spaced-apart fixed tubular base members, of a plurality of upright members having their lower ends adjustably seated in said base members, and series of cross-rails for connecting said upright members, the upper ends of said upright members removably receiving and seating the ends of said cross-rails; substantially as described.

10. A skeleton table of the class described comprising series of tubular base members, series of upright members having their lower ends adjustably seated in said base members, means adapted to lock said upright members in adjusted positions in said base-members, and series of cross-rails removably seated on the upper ends of said upright members; substantially as described.

11. A skeleton table of the class described comprising series of tubular base-members, upright members having their lower ends threaded and loosely seated in said base members, adjustable nuts on the threaded ends of said upright members adapted to rest upon the top of said base-members, means adapted to removably lock said upright members to said base-members, and series of cross-rails removably seated on the upper ends of said upright-members; substantially as described.

12. A skeleton table of the class described comprising series of vertically adjustable uprights, grooved heads on the upper ends of said uprights, and cross rails having their ends removably seated in said grooved heads; substantially as described.

13. In a skeleton table of the class described, the combination with a plurality of spaced-apart vertically adjustable uprights, of grooved heads on the upper ends of said uprights, cross-rails for connecting said uprights, the grooves of said heads removably receiving and seating the ends of said rails, and means on said heads for engaging said rails at their ends to releasably lock the same to said heads; substantially as described.

14. A skeleton table of the class described comprising series of vertically adjustable uprights, grooved heads carried on the upper ends of said uprights, cross-rails having their ends removably seated in said heads, each of said heads being adapted to accommodate and seat the connecting ends of four of said cross-rails, and means for locking the ends of said rails to said heads; substantially as described.

15. A skeleton table of the class described comprising series of independently adjustable vertically-disposed supports arranged at regular distances apart, grooved heads carried on the upper ends of said uprights, cross-rails having their ends removably seated in said heads, each of said heads being adapted to accommodate and seat the connecting ends of four of said cross-rails, and means for locking the ends of said rails to said heads; substantially as described.

16. A skeleton table of the class described comprising series of tubular base members, series of fixed upright members having their lower ends adjustably seated in said base members, series of cross-rails for connecting the upper ends of said upright members and means for locking said upright members to said base members; substantially as described.

17. A skeleton table of the class described comprising series of fixed tubular base members, upright members having their lower ends threaded and seated in said base members, series of cross-rails for connecting the upper ends of said upright members and adjustable nuts on the threaded portion of said upright members adapted to rest upon the top of said base members; substantially as described.

18. A skeleton table of the class described comprising series of fixed tubular base-members, upright members having their lower ends threaded and loosely seated in said base-members, adjustable nuts on the threaded ends of said upright members adapted to rest on the top of said base-members, series of cross-rails for connecting the upper ends of said upright members and means adapted to releasably lock said upright members to said base-members; substantially as described.

In testimony whereof, I have signed my name to this specification, in the presence of two subscribing witnesses.

THEODORE E. CRECELIUS.

Witnesses:
RUTH PETERSON,
ZELMA D. PINCUS.

Copies of this patent may be obtained for five cents each, by addressing the "Commissioner of Patents, Washington, D. C."